May 16, 1939. N. D. PRESTON Re. 21,086
CENTRALIZED TRAFFIC CONTROLLING SYSTEM FOR RAILROADS
Original Filed Aug. 18, 1933 3 Sheets-Sheet 1
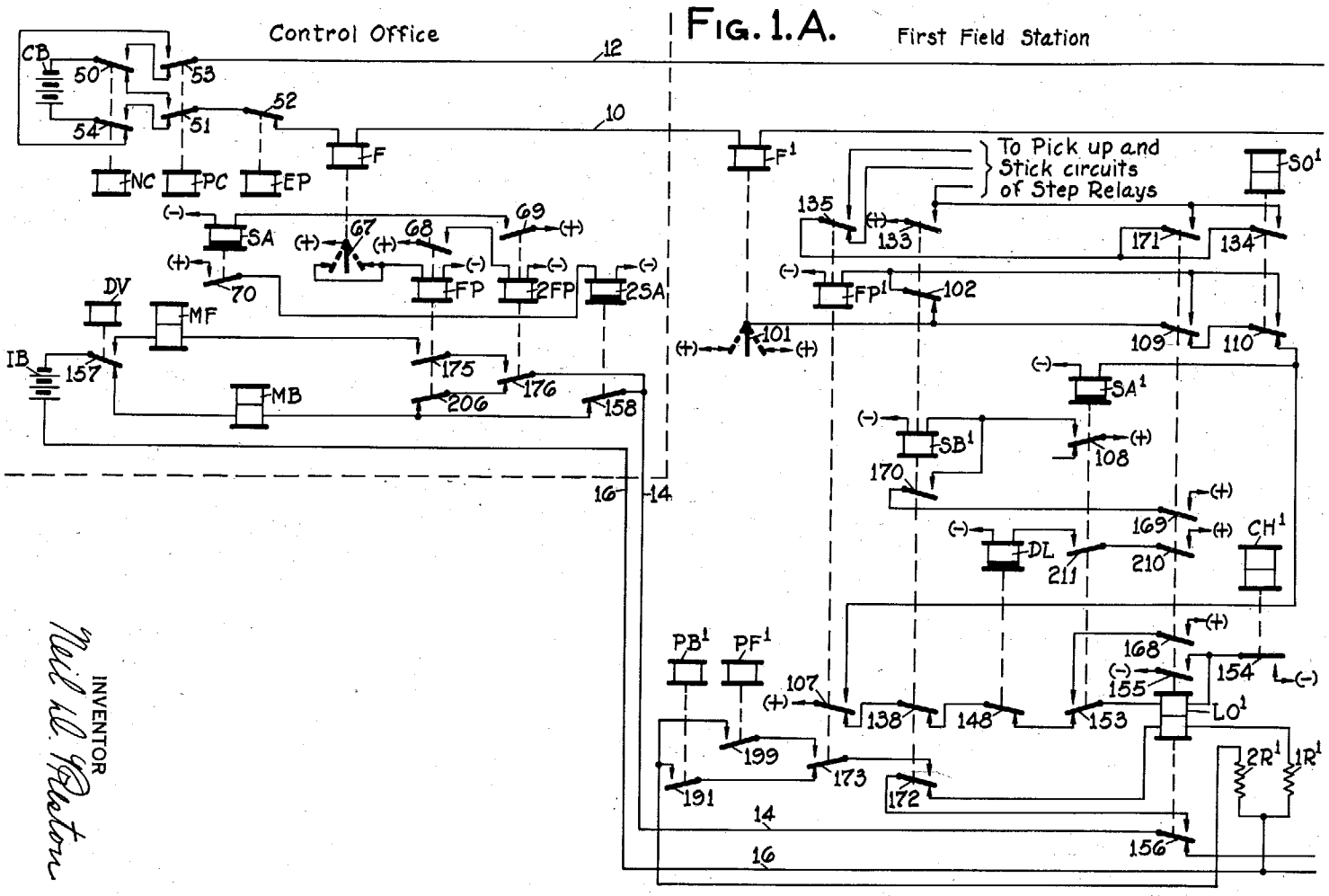
INVENTOR
Neil D. Preston CENTRALIZED TRAFFIC CONTROLLING SYSTEM FOR RAILROADS
Original Filed Aug. 18, 1933 3 Sheets-Sheet 2
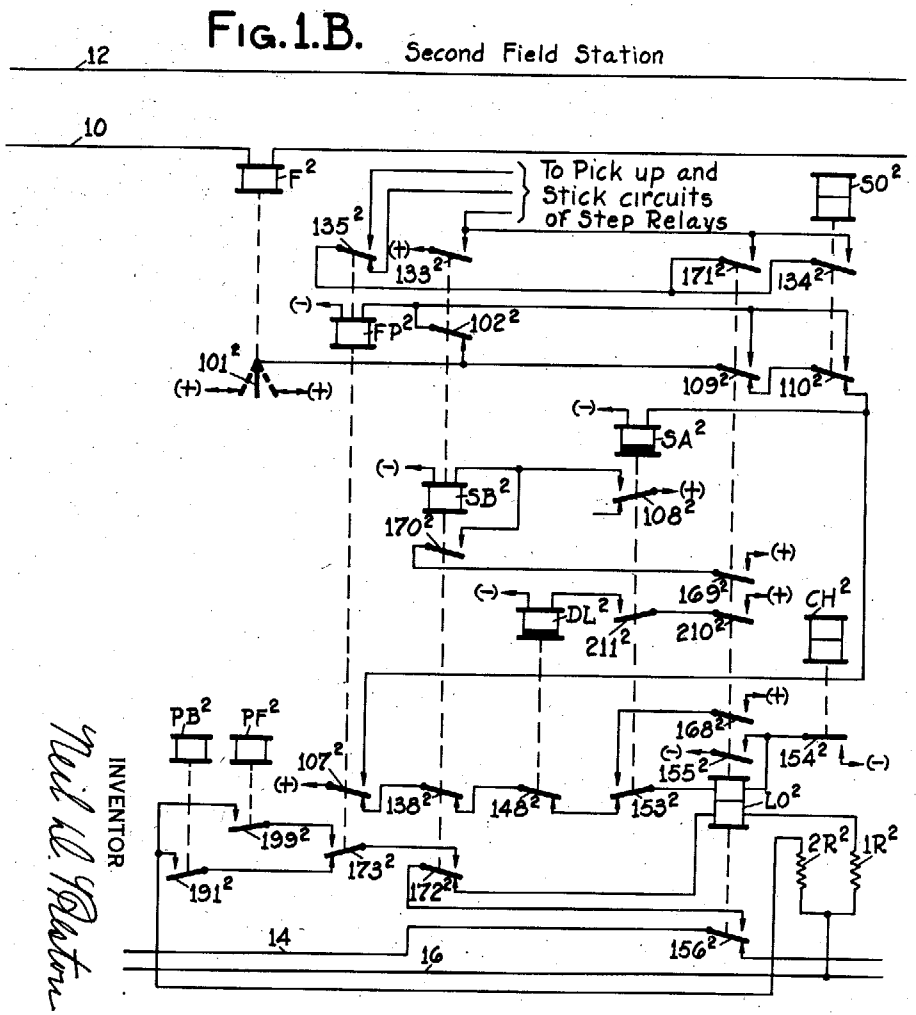
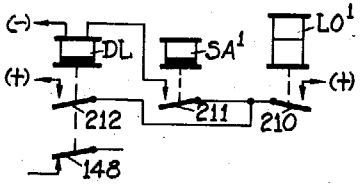

CENTRALIZED TRAFFIC CONTROLLING SYSTEM FOR RAILROADS

Original Filed Aug. 18, 1933 3 Sheets-Sheet 3

INVENTOR
Neil D. Preston

Reissued May 16, 1939

Re. 21,086

UNITED STATES PATENT OFFICE 21,086

CENTRALIZED TRAFFIC CONTROLLING SYSTEM FOR RAILROADS

Neil D. Preston, Rochester, N. Y., assignor to General Railway Signal Company, Rochester, N. Y.

Original No. 2,045,723, dated June 30, 1936, Serial No. 685,765, August 18, 1933. Application for reissue December 3, 1937, Serial No. 177,923

13 Claims. (Cl. 177—353)

Figure 3:
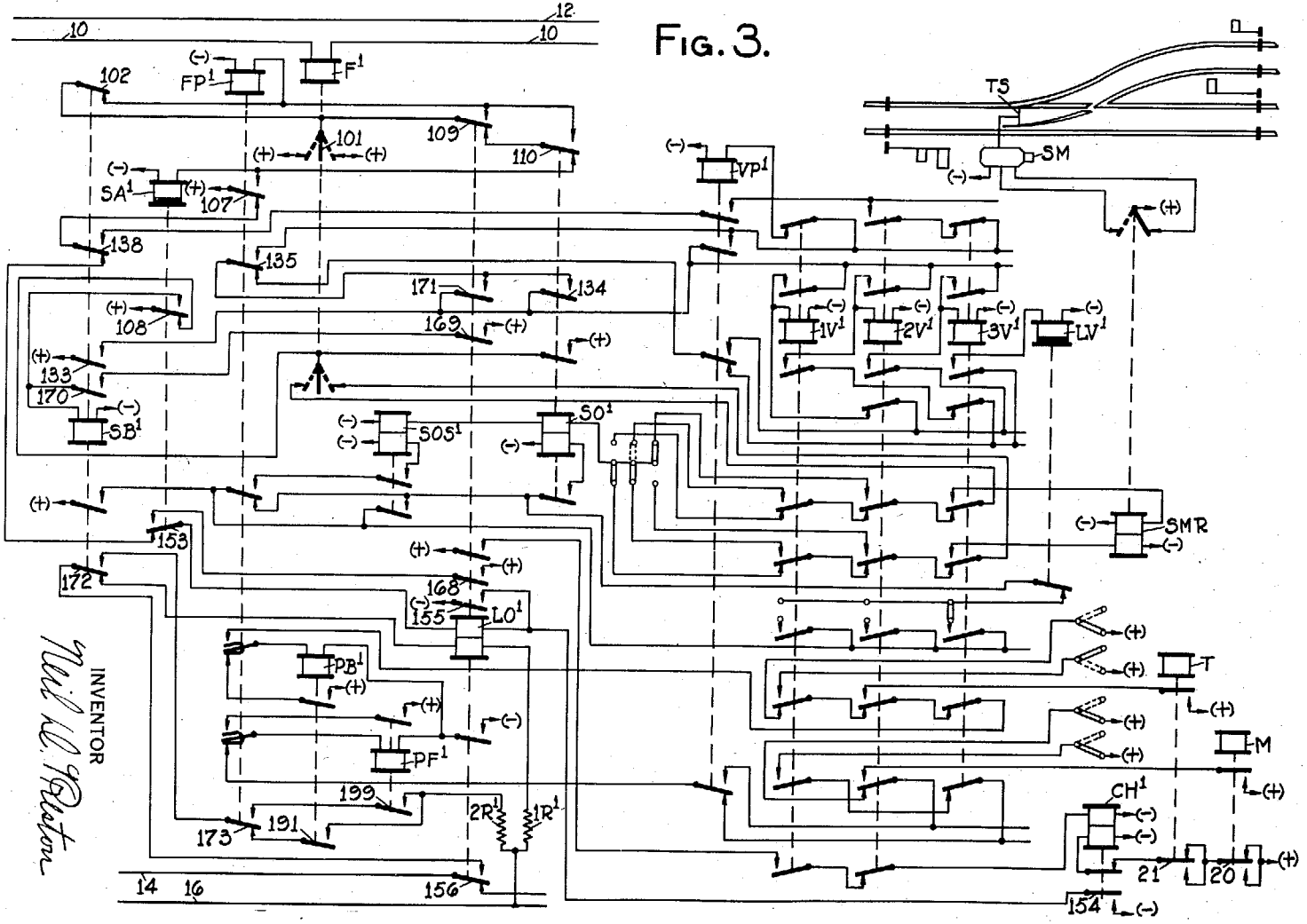

This invention relates to centralized traffic controlling systems for railroads and it more particularly pertains to the means employed for inter-relating the operation of a plurality of field stations with the operation of the communication part of such a system.

In that type of centralized traffic controlling system where a communication system of the station selective type is employed, control impulses are transmitted from the control office to the several field stations during separate operating cycles. Similarly, indication impulses are transmitted to the control office in accordance with the particular station which obtains access to the communication line and in accordance with the positions of the various traffic controlling devices at the associated station.

In such a centralized traffic controlling system, where only one field station may be in communication with the control office at any one time and where the communication system is normally at rest, it is necessary to provide means for storing the fact that a change in the condition or position of the traffic controlling devices at a field station has occurred, so that such a change may initiate the system for the transmission of indications from that particular field station in accordance with the new conditions.

In a centralized traffic controlling system of the type outlined above, it may occur that the stored condition of a change at a field station is maintained for an abnormal period of time, due either to failure of the system to properly transmit the indications or to the continued operation of one or more devices at the station. Either case results in that station monopolizing the indication transmitting line so that other stations with changed indications to transmit are prevented from obtaining use of the communication line, when such other stations are of inferior order as determined by the lock-out arrangement provided in the system.

In view of the above and other considerations, the present invention proposes to provide means whereby a changed condition at a field station may be suitably stored, with this storing means having associated therewith other means which prevents that field station obtaining access to the communication system until a succeeding cycle is allotted to the use of another field station, after which the station which is attempting to monopolize the communication line may again obtain access to the communication system. In a modified form of the present invention means are provided which prevents a field station obtaining access to the communication system after it has once transmitted its indications until a condition exists when no other station in the system has new indications to transmit.

Other objects, purposes and characteristic features of the present invention will be in part obvious from the accompanying drawings and in part pointed out as the description of the invention progresses.

In describing the invention in detail reference will be made to the accompanying drawings which illustrates in a diagrammatic manner the apparatus and circuits employed at the control office and at a single field station in accordance with the present invention and associated with a communication system indicated as comprising two line circuits connecting the field station with the control office.

A centralized traffic controlling system organized as contemplated in accordance with the present invention is considered as comprising a control office located at a convenient point and a plurality of field stations located throughout the territory under the control of an operator in the control office. The communication system connecting the control office with the single field station illustrated, and extending to other field stations in the system, may be of any suitable type but for convenience in disclosing the present invention it is assumed that such communication system is of the station selective duplex coded type as disclosed, for example, in the pending application of T. J. Judge et al., Ser. No. 640,062, filed October 28, 1932, now Patent No. 2,082,544 granted June 1, 1937, of which one field station has been shown in Fig. 3 of the drawings. It is to be understood however, that the specific form of communication system is not essential to the functioning of the present embodiment, but rather the means disclosed in the present invention may be considered as an adjunct to any type of communication system.

In the communication system contemplated as used in connection with the present invention, a series stepping and control line circuit connects the control office with the several field stations and receives control impulses from a suitable source of energy located in the control office. A series message or indication line circuit also receives energy from a suitable source of energy located in the control office and this line circuit is impulsed from any one of the several stations.

With reference to the accompanying drawings, a portion of the control office apparatus is illustrated within the rectangle bounded by the dashed line in the upper left hand portion of Fig. 1A. A portion of the apparatus at a typical field station is illustrated in the right hand portion of Fig. 1 and also in Fig. 1B, and is shown connected to the control office by the control line conductor 10, the control line return conductor 12, indication line conductor 14, and indication return line conductor 16. A more complete field station, with the invention of this application omitted therefrom and identical to the field station shown in Fig. 3 of the Judge et al. patent above referred to is shown in Fig. 3.

A modified form of the invention is illustrated in Fig. 2 of the drawings.

This system is of the station selective type, the station being selected by receiving control impulses which energizes the station relay $SO^1$ associated with that station. Similarly, whenever a lock-out relay such as relay $LO^1$ is energized at a particular station, this station may control the impulsing of the indication line conductors 14 and 16 in accordance with the indications to be transmitted on each step from this particular station. The energization of relay $LO^1$ or $LO^2$ causes the system to be immediately initiated into a cycle of operations.

During the application of each control impulse to the stepping and control line conductor 10, the contacts of a line repeating relay $F^1$ for the first field station and relay $F^2$ for the second field station are positioned in accordance with the polarity of the control impulses for the selection of the required station and for the transmission of controls to this station after it is selected. The second field station illustrated is identical to the first field station shown except that all reference characters contain an exponent "2".

Since a description of the operation of the stepping relay bank as well as the station selecting operation of the system is unnecessary for an understanding of the present invention, only those relays and contacts have been illustrated which are considered necessary to show the manner in which the present invention is applied to the system fully disclosed in the above mentioned Judge et al. patent, a field station of which has been illustrated in Fig. 3 of the drawings.

*Field station equipment (Fig. 3)*

The field station equipment illustrated in Fig. 3 of the accompanying drawings is identical to that shown in the prior patent to Judge above referred to and is typical of all field stations of the system, except that the relay DL has been omitted therefrom, and may be adapted for use at the first, second, or any other location by merely altering certain code jumpers and selections to arrange for the proper code. But for convenience in the description, it is assumed that this field station is at the first location along the line circuits extending from the control office, and is so designated by reason of the distinctive exponents employed.

With reference to Fig. 3, a turn-out track is illustrated as connected to a main track by a track switch TS. This track switch TS is operated from one extreme locked position to the other by a suitable switch machine SM.

This switch machine SM is governed by a switch machine control relay SMR which is of the two-position polar magnetic stick type and which is governed from the control office through the medium of the communication system herein disclosed. The relay SMR controls the operation of the switch machine SM by energizing its normal or reverse operating wires from a source local to the field station in any suitable well-known manner.

Suitable signals are associated with the track switch TS for governing traffic thereover and are provided with automatic block signalling means with selections made in accordance with the position of the track switch TS and condition of the detector track section and such other sections of track and traffic controlling devices as may be associated therewith.

Associated with the signals governing traffic over the track switch TS is a suitable signal indicating relay M which is normally energized but is deenergized whenever any one of the signals is actuated or caused to give a proceed indication.

A detector track section having a normally closed track circuit is provided with a track relay T and a suitable track battery for indicating the passage of trains over the track switch TS.

The communication part of the system includes at the field station a three position biased-to-neutral polar line relay $F^1$, as previously mentioned, together with its quick acting line repeater relay $FP^1$. These relays $FP^1$ and $SA^1$ have similar characteristics as the corresponding relays in the control office, the only difference being in the control of these relays which is subject to certain conditions explained in detail in the Judge patent above referred to.

The field station includes a bank of stepping relays $1V^1$, $2V^1$, $3V^1$ and $LV^1$ together with a half-step relay $VP^1$.

For the selection of the station for the reception of controls a station selecting outbound relay $SO^1$ together with a stick relay $SOS^1$ is provided to determine when the code call placed upon the control line circuit corresponds to the code call assigned to the field station.

The selection of a station for the transmission of indications is rendered available at the field station by the continued energization of the lock-out relay $LO^1$. When the lock-out relay $LO^1$ is picked up for a cycle of operation, the pulsing relays $PB^1$ and $PF^1$ are effective to transmit the code call of the station followed by a transmission of indications.

A stick relay $SB^1$ picked up by the slow acting relay $SA^1$ is provided to determine the restoration of the station in a positive manner at the end of each cycle of operation.

The change relay $CH^1$ is provided to register a change in any of the traffic controlling devices at the station, so that the system will be initiated for the transmission of new indications.

*Automatic starting from a field station (Fig. 3)*

A change in the indication conditions at a field station may include change in the condition of the detector track section, a change in the condition of the track switch, a change in the condition of the signals, or any one of several other changes may occur, such as approach track sections or the like, but as illustrative of such conditions, only the change in the condition of the detector track section or signals have been shown as being effective to transmit indications in the typical field station embodying the present invention (see Fig. 3).

For example, the movement of either the track relay contact 21 or the signal-at-stop relay contact 20 from a front point to a back point or vice versa, or the simultaneous change in the position of these contacts, momentarily opens the stick circuit of the relay $CH^1$ so that its contacts assume deenergized positions prior to the reclosure of its stick circuit insofar as the contacts 21 and 20 of the relays T and M respectively are concerned, all of which will be readily understood as it is at this time well known in the art, that a quick acting relay, such as relay $CH^1$, will accomplish this feature when employed with the relatively slow acting signalling relays T and M.

With the system in a normal at rest condition, the deenergization of the change relay $CH^1$ closes a pick-up circuit for the lock-out $LO^1$ from (+), through a circuit including back contact 107 of relay $FP^1$, back contact 138 of relay $SB^1$, back contact 153 of relay $SA^1$, upper winding of the lock-out relay $LO^1$, back contact 154 of the change relay $CH^1$, to (—). As soon as the contacts of the lock-out relay $LO^1$ have responded to such energization, a stick circuit is closed for the relay $LO^1$ from (+), through a circuit including back contact 107 of relay $FP^1$, back contact 138 of relay $SB^1$, back contact 153 of relay $SA^1$, upper winding of lock-out relay $LO^1$, front contact 155 of relay $LO^1$, to (—).

The closure of front contact 156 of the lock-out relay $LO^1$ completes the indication line circuit through this field station (see Fig. 1A). For example, the indication line circuit is closed from the positive terminal of the indication battery IB in the control office (see Fig. 1A), through a circuit including back contact 157 of relay DV, lower winding of the relay MB, back contact 158 of relay 2SA, through the indication line wire 14 to the first field station (see Fig. 1A), front contact 156 of the relay $LO^1$ at the first field station, back contact 172 of relay $SB^1$, lower winding of the lock-out relay $LO^1$, compensating resistance $IR^1$, to the indication line return wire 16, and thence to the control office to the negative terminal of the indication battery IB.

At that field station which maintains its lock-out relay LO (with suitable exponent) energized until the end of the lock-out period, a stick circuit is closed which is maintained until the end of that cycle of operation. For example, this stick circuit for the lock-out relay $LO^1$ at the first field station (see Figs. 1A, 1B or 3) is closed from (+), through a circuit including front contact 168 of relay $LO^1$, front contact 153 of relay $SA^1$, upper winding of relay $LO^1$, front contact 155 of relay $LO^1$, to (—).

With the lock-out relay $LO^1$ picked up and stuck up indications are transmitted from the first field station as more specifically pointed out in the Judge et al. patent above referred to to which reference may be made for a more complete description of the system to which the present invention has been shown applied in Figs. 1A and 1B.

It is thus seen that for the first field station a change relay $CH^1$ is provided which responds to a change in condition of the various traffic controlling devices located at the associated station. A slow acting relay $SA^1$ which may be called a cycle marking relay, is picked up at the beginning of each cycle of operations and is maintained energized until the end of such cycle. A slow acting detained lock or cycle suppressing relay DL is provided, which relay is picked up at the start of a cycle only at the station which obtains access to the communication system. This relay has such slow acting characteristics that it maintains its armature in its attracted position between successive cycles, when the cycles follow each other in rapid succession as determined by the fact that a station is waiting to obtain access to the communication line when a particular cycle of operations is terminated. In other words, relay DL will be dropped at the end of a cycle, during which it has been energized, if there is no other station waiting with indications to transmit. If there is another station waiting then the suceeding cycle is started in such short order that relay DL is not dropped between cycles.

The communication part of the system includes at the first field station a three-position biased-to-neutral polar line relay $F^1$ together with its quick acting line repeating relay $FP^1$. Quick acting neutral relay $SB^1$ repeats the operations of slow acting relay $SA^1$, that is, relay $SB^1$ is picked up at the beginning of a cycle and is dropped at the end of the cycle. At this field station suitable compensating resistances $IR^1$ and $2R^1$ are provided to compensate for the difference in distance between the field station at which they are located and the control office. In other words, the field station at the end of the system requires no resistances but for each station nearer the control office, higher resistances are employed so that the same value of current from the indication line battery IB always flows through the indication line circuit irrespective of the station which is transmitting.

Resistance $2R^1$ is employed during the transmission of indications and resistance $IR^1$ is employed during the lock-out period at the beginning of a cycle of operations. Relays $PB^1$ and $PF^1$ are used to control the impulsing of the indication line circuit as determined by contact 173 of relay $FP^1$ in its back and front positions respectively.

That part of the control office illustrated shows more particularly the portion of the apparatus and circuits which cooperate with the field station circuits to illustrate the method of operation of the present invention. The control office includes a control line relay F of the three-position biased-to-neutral polarized type and its associated neutral quick acting line repeating relay FP which repeats each energization and each deenergization of the line relay F irrespective of the polarity with which relay F is energized. The line repeating relay FP is provided with a neutral quick acting repeating relay 2FP. A slow acting line repeating relay SA is picked up at the beginning of each cycle and is dropped at the end of the cycle. Associated with relay SA is a neutral slow acting repeating relay 2SA having similar characteristics.

Associated with the line relay and the line repeating relays in the control office is a bank of stepping relays (not shown) provided to mark off the steps of each cycle of operations. An impulsing relay EP is controlled by the stepping relays for governing the time spacing of the impulsing applied to the control line circuit. A branch dividing relay DV is provided which repeats the condition of relay EP for the purpose of selecting the front and back branches of the indication line circuit in the control office.

The polarity of the impulses applied to the control line circuit from the control battery CB is determined by code sending relays PC and NC. These relays are controlled in accordance with the positions of the code jumpers and control levers which are rendered effective for a particular cycle of operations by the corresponding code determining relay associated with the station to be selected.

Two neutral message receiving relays MB and

MF are energized over the message or indication line circuit at each step. The conditions of these relays are stored in suitable pilot and indication storing relays but for the purpose of this disclosure it is considered necessary to show only the energizing circuits of these relays, since these circuits cooperate in the lock-out feature which is to be later explained.

It is believed that the nature of the invention, its advantages and characteristic features can best be understood with further description being set forth from the standpoint of operation, remembering that a complete system to which the invention is described may be as shown in the above mentioned Judge et al. patent. Most of the reference characters applied to the present drawings correspond to those used in the above mentioned Judge et al. patent. The exceptions are those which relate to the circuit of the detained lock relay DL, which relay provides the fundamental feature of the present invention and its cooperation with the complete communication system.

Operation

The system of the present invention is normally in a passive condition, or condition of rest, from which it may be initiated into its active condition either from the control office or from any of the field stations whenever there are new controls or new indications to be transmitted. If several field stations have indications ready for transmission at the same time these indications are transmitted from such field stations to the control office, one station at a time during separate operating cycles.

*Normal conditions*

With the system normally at rest, the change relay $CH^1$ is maintained energized through the usual track circuit relay contacts and the contacts of the usual switch repeating relay, which relays and circuits have been included only in the Fig. 3 drawing since the organization of such circuits is well known in the art.

In order that the communication system may be initiated into operation from each of the several field stations of the system, the message or indication circuit, including line conductors 14 and 16, is normally connected to battery IB in the control office.

*Automatic transmission of indications*

Any change in the indication conditions at a field station as, for example, the occupancy of the detector track section or a change in position of the track switch, is indicated by the track relay or the switch repeating relay respectively causing the deenergization of relay $CH^1$. Relay $CH^1$ drops its contact 154 which closes a circuit for picking up relay $LO^1$ extending from (+), back contact 107 of relay $FP^1$, back contact 138 of relay $SB^1$, back contact 148 of relay DL, back contact 153 of relay $SA^1$, upper winding of relay $LO^1$ and back contact 154 of relay $CH^1$, to (—). Relay $LO^1$ applies (—) potential through its front contact 155 to the right hand terminal of its upper winding for maintaining the above described circuit complete even though relay $CH^1$ is again picked up. The purpose of this substitute (—) potential is to maintain the lock-out relay in its picked up position after relay $SA^1$ has been picked up and throughout the remainder of the cycle, during which cycle relay $CH^1$ is resensitized by being again energized.

The closure of front contact 156 of relay $LO^1$ completes the indication line circuit through this particular field station over a circuit extending from the (+) terminal of battery IB in the control office, back contact 157 of relay DV, lower winding of relay MB, back contact 158 of relay 2SA, indication line wire 14, front contact 156 of relay $LO^1$, back contact 172 of relay $SB^1$, lower winding of relay $LO^1$, compensating resistance $IR^1$, indication line return wire 16 and thence to the (—) terminal of battery IB.

It will be apparent that, should the change have occurred at some other field station, the indication line circuit would have been closed at that station through a front contact similar to contact 156 of the associated lock-out relay and a back contact similar to 172, through the lower winding of the associated lockout relay and the compensating resistance to indication line conductor 16. At any rate, the energization of the indication line circuit, including the lower winding of the message receiving relay MB picks up relay MB and initiates the system into a cycle of operations in a manner which is fully disclosed in the above mentioned Judge et al. patent.

The initiation of the system, irrespective of whether controls are to be transmitted or not, results in the synchronous operation of the stepping relays at the control office and at each field station. The application of the first stepping impulse to the control line conductor 10 causes relays $FP^1$, $SA^1$ and $SB^1$ to be energized. Relays $SA^1$ and $SB^1$ remain energized throughout the cycle while relay $FP^1$ repeats each stepping impulse.

*Lock-out between field stations*

Since this invention is applied to a system in which a plurality of field stations are connected by means of a common communication circuit to the control office, it becomes necessary to provide means whereby only one station at any one time can actively associate itself with the communication circuit for the transmission of indications. The particular lock-out arrangement is the same as disclosed in the above mentioned Judge et al. patent but in order to show the cooperation of the present invention with the lock-out organization of a centralized traffic controlling system, the lock-out feature will be briefly explained.

It may happen that a change in the indication conditions may occur at several field stations at the same time. In order to prevent more than one station actually interrupting the indication line circuit during a particular cycle of operations, the lock-out relay of only one station can be in its picked up position after a cycle has been initiated. The lock-out means provided at each field station is effective to select that station nearest the control office, having new indications to transmit at the beginning of a cycle of operations.

This system has what may be termed an initiating period and a lock-out period at the beginning of each cycle. The initiating period may be said to include the time which elapses between the occurrence of a change in conditions at a field station, up to the instant that the quick acting line repeating relays (such as relay $FP^1$) at the field stations pick up their contacts in response to the first impulse applied to the control line circuit.

The lock-out period may be considered as that time which elapses between the actual picking up of the contacts of the FP relays at the associated stations and the picking up of their respective slow acting SA relays, similar to relay $SA^1$. In the event that two change relays such as relay $CH^1$ drop their contacts at substantially the same time, it will be apparent that two lock-out relays such as relay $LO^1$ will be energized over circuits including the upper windings of the lock-out relays.

Assuming that relay $LO^1$ is picked up at the same time that a similar lock-out relay $LO^2$ at a second station farther out the communication line is picked up, the indication line wire 14 is connected to the indication line return wire 16 at the indicated field station by reason of the closed contact 156 of relay $LO^1$. The other lock-out relay $LO^2$, at the more distant station, cannot close an initiating circuit because of the open back contact 156 of relay $LO^1$. During the lock-out period relay $LO^1$ will be selected, since it will be maintained energized subsequent to the picking up of relay $FP^1$ by reason of its lower winding being included in the indication line circuit until its stick circuit is closed at the end of the lock-out period by the picking up of contact 153 of relay $SA^1$. The lock-out relay $LO^2$ at the station farther out the line will drop away during the lock-out period because it has no selecting circuit completed over the indication line circuit.

Two or more stations may have changes in indication conditions which occur in succession instead of simultaneously. In such cases where the last change occurs at a station nearer the control office prior to the picking up of the FP relays, then the lock-out relays at the stations farther out the line will be dropped out during the lock-out period, for their pick-up circuits are opened by their respective FP relays and their selecting circuits are opened by reason of the picked up lock-out relay which is closest to the control office. It is of course obvious that when the first change occurs closer to the control office, the lock-out relay at such station will be selected.

On the other hand, no lock-out relay, irrespective of its location, can be picked up subsequent to the picking up of the FP relays at the beginning of a cycle, because their pick-up circuits are initially opened at back contacts similar to 107 of the various FP relays and these circuits are maintained open throughout the cycle by back contacts similar to 138 of the SB relays.

During an operating cycle for the transmission of indications, the step-by-step operation at the field station is dependent upon front contact 171 of lock-out relay $LO^1$. It will be understood that during a cycle for the transmission of controls when relay $LO^1$ is not picked up, the step-by-step operation at the field station is dependent upon front contact 134 of relay $SO^1$.

*Automatic suppression of a station*

It will now be assumed that the station illustrated in Fig. 1A actively associates itself with the communication circuit for transmitting indications to the control office as determined by the actuation of relays $LO^1$, $SA^1$ and $SB^1$. The lock-out operation, the synchronous stepping operation, the registration of the station in the control office and the transmission and recording of the indications are all effected as shown and described in the above mentioned Judge et al. patent.

The operation whereby this particular station actively associates itself with the communication circuit has been briefly described above. When relay $SA^1$ is picked up at the start of the cycle (with relay $LO^1$ picked up) a circuit is closed for picking up relay DL extending from (+), front contact 210 of relay $LO^1$, front contact 211 of relay $SA^1$ and winding of relay DL, to (−). With back contact 148 of relay DL picked up, the pick-up circuit of relay $LO^1$ (upper winding) is maintained open but relay $LO^1$ remains stuck up until the end of the cycle over a circuit extending from (+), front contact 168 of relay $LO^1$, front contact 153 of relay $SA^1$, upper winding and front contact 155 of relay $LO^1$, to (−).

At the end of this particular cycle, the system returns to its normal-at-rest position as illustrated in Fig. 1, with relay DL dropping after a predetermined interval of time has been measured off following the dropping of front contact 211 of relay $SA^1$. If there is no other station waiting with indications to transmit, the dropping of contact 148 of relay DL makes it possible for the particular station illustrated to again actively associate itself with the communication circuit. If it were not for the interruption of the pick-up circuit including the upper winding of relay $LO^1$ by contact 148 of relay DL, it is obvious that this field station could continuously actively associate itself with the communication line, thereby excluding other stations located farther out the line. This condition might be occasioned because of the faulty operation of some of the circuits at this particular station, which would prevent any inferior station sending its indications.

Assuming that there is another station waiting with indications to transmit when the system reaches the end of the cycle, during which the station illustrated in Fig. 1 used the line, then at the time relay $SA^1$ is dropped other similar SA relays will drop their contacts so that other stations, irrespective of their location, may have an opportunity to pick up their lock-out relays and start a consecutive cycle before relay DL of the illustrated station drops its contact 148. Therefore, at the end of the cycle relay DL introduces a time interval during which this particular illustrated station is prevented from actively associating itself with the communication circuit. During this interval another station may actively associate itself with the communication circuit in accordance with its order of preference, as determined by its geographic location should there be more than one station waiting when the end of the cycle is reached.

From the above explanation it will be obvious that a field station, at which a condition exists which causes the station to attempt to actively associate itself with the communication circuit at the end of each cycle, can again obtain access to the communication circuit only after one intervening cycle has occurred if another station is waiting. This is because, during the second cycle when another station is permitted to use the line, relay DL will be dropped so that this particular station can actively associate itself with the line circuit to the exclusion of other inferior stations. Briefly, when such a condition exists that a particular station persists in successively actively associating itself with the communication circuit, the detained lock relay DL prevents this taking place except possibly on every other cycle as determined by whether or not another station wants the use of the line.

*Description of modification*

A modification of the detained lock feature has been illustrated in Fig. 2. This circuit is exactly the same as the circuit of Fig. 1 except for the addition of front contact 212 on relay DL. This added front contact provides a stick circuit for relay DL as long as relay $SA^1$ is picked up. This means that when a particular station, with a condition existing which causes it to attempt to use the communication circuit continuously after it has once used it, is prevented from again actively associating itself with this circuit until there are no other stations in the system with indications to transmit.

Relay DL is picked up at the start of a cycle when the particular station obtains access to the line circuit as previously described. It is stuck up over a circuit extending from (+), front contact 212 of relay DL, front contact 211 of relay $SA^1$ and winding of relay DL, to (—). At the end of the cycle, relay $SA^1$ drops its contact 211 which allows relay DL to drop its contact if there is no other station waiting with indications ready to transmit. Therefore, this particular station can again initiate a cycle and actively associate itself with the communication circuit by again picking up its lock-out relay over the previously described circuit extending through back contact 148 of relay DL.

Assuming that there are several other stations awaiting the end of the cycle with indications to transmit, relay $SA^1$ will drop its front contact 211 at the end of the cycle but will again pick up this front contact before relay DL has time to drop its contacts. This is because some other station initiates a consecutive cycle of operation for consecutive cycles and causes all SA relays to be picked up. During this next succeeding or consecutive cycle, relay DL is again energized so that it measures off a similar time interval at the end of the next cycle; and if another station actively associates itself with the communication circuit, relay $SA^1$ is again picked up to energize relay DL before it has had time to drop its contacts. This operation continues and keeps relay DL picked up for consecutive cycles until the end of a cycle is reached when there is no station awaiting use of the line. Then relay DL will drop and the communication system can be used by this particular station.

From the above description of the operation of the system when arranged as in Fig. 2 it will be obvious that all stations will transmit their indications in rotation in accordance with their geographic location when several stations are ready to transmit at the same time, even if a preferred station continues to have indications ready for transmission before all other stations complete their transmission. In other words, assuming that stations 1,2 and 3 so numbered with respect to their location from the control office, have indications ready to transmit at the same time and further assuming that station 1 continues to have indications ready for transmission after its use of the system, the order of sequence of operation will be the transmission from stations 1, 2 and 3 in the order named, followed by the transmission from station 1 because it continues to have indications ready for transmission.

It is to be understood in connection with the present invention, that any desired means may be provided for introducing the time interval above mentioned. For example, one or more additional slow acting relays may be successively picked up after relay DL is picked up, with back contact 148 controlled by the last slow acting relay in the series. In this way any desired interval of time may be measured off to suit actual operating conditions. Similarly, a thermal time element relay could be used in place of the slow acting relay DL to introduce the time delay.

It is also to be understood that the embodiment of the present invention can be used in connection with other forms of lock-out systems instead of the geographic type illustrated in Figs. 1A and 1B. For example, the superiority of code type lock-out, as effected by the operation of the SI relay disclosed in the prior application of W. D. Hailes et al., Ser. No. 526,674, filed March 31, 1931, can be used.

Having described a centralized traffic controlling system embodying several specific embodiments of the present invention, it is desired to be understood that the forms shown have been selected to facilitate in the disclosure of the invention rather than to limit the number of forms which it may assume and it is to be further understood that various modifications, adaptations and alterations may be applied to the specific forms shown to meet the requirements of practice without in any manner departing from the spirit or scope of the present invention except as limited by the appended claims.

What I claim is:

1. In a remote control system, a control office and a plurality of field stations, a lockout relay at each station, means for simultaneously energizing a plurality of said lockout relays, means for maintaining one and only one of said lockout relays energized during an operating cycle of said system, means for transmitting messages from one of said stations to said office when the associated lockout relay is operated, a cycle marking relay, means for operating said cycle marking relay to an active condition during an operating cycle and maintain it in its active condition during such operating cycle, and slow acting means controlled by said cycle marking relay for rendering the operating circuit of said associated lockout relay ineffective for a comparatively long time interval which time interval begins when said cycle marking relay is returned to its inactive condition.

2. In a remote control system, a control office, a first field station, a plurality of other field stations, a communication system connecting said office with said stations, means including said communication system for transmitting indications from each of said stations to said office in response to a change in condition at the corresponding station, a cycle marking relay energized in response to the active association of said first station with said communication system, slow acting means controlled to an active condition by said cycle marking relay for measuring off a predetermined time interval after said first station is disassociated from active use of said communication system, and means including said cycle marking relay for preventing said slow acting means returning to its inactive condition as long as any one of said other stations is transmitting indications or as long as any one of said other stations initiates the transmission of other indications before said time interval has been measured off.

3. In a remote control system, a control office and a plurality of field stations connected by a line circuit, a lockout relay at each station, a first local circuit for the lockout relay at each station, a second circuit including said line circuit for the lockout relay at each station, means for energizing one and only one of said lockout relays by way of said first and said second circuits during an operating cycle of said system, means for energizing another of said lockout relays by way of its first circuit only during said cycle, means for transmitting messages from one of said stations to said office only during the cycle that the associated lockout relay is energized by way of its first and its second circuits, and means including a slow acting device for rendering the first circuit of the associated lockout relay ineffective for a comparatively long time interval beginning at the end of a cycle during which said associated lockout relay was energized by means of its second circuit.

4. In a communication system, a control office and a plurality of stations connected by a line circuit, means for operating said system through cycles of operations, means including a lockout relay at each of said stations for initiating said system into cycles of operations by actively associating the corresponding station with said communication system, means including the lockout relay at a particular station for preventing all other stations from being actively associated with said communication system, a time measuring device at each of said stations, means responsive to the active association of a station with said communication system for operating the associated device to its active condition and to maintain it active until a predetermined time after said communication system completes a cycle of operations, and means including said device for preventing the associated station from actively associating itself with said communication system so long as said device is in its active condition.

5. In a communication system, a control office, a superior station and an inferior station connected to said control office by a line circuit, means for operating said system through cycles of operations, means including a lockout relay at each of said stations for initiating said system into cycles of operations and actively associating the corresponding station with said communication system, means including the lockout relay at said superior station for preventing said inferior station from being actively associated with said communication system, a time measuring device at said superior station, means responsive to the active association of said superior station with said communication system for operating said device to its active condition and to maintain it in its active condition so long as said inferior station is actively associated with said communication system, and means including said device for preventing said superior station from actively associating itself with said communication system as long as said device is in its active condition.

6. In a communication system of the code type for the transmission of indications of the operated condition of various changeable devices from any one of a number of field stations one at a time over a line circuit to a distant control office; field equipment for each field station comprising; code transmitting apparatus operable to govern the energization of the line circuit at successive time intervals during an operating cycle and thus transmit indications of the existing condition of the changeable devices associated with the corresponding field station; a starting circuit for initiating operation of said code transmitting apparatus; means responsive to a change in the condition of any one of the changeable devices at the station for governing the energization of said starting circuit; and a time element device automatically operated during a single operating cycle of code transmission of indications from the corresponding station to render said starting circuit for that station ineffective for a time interval after the end of such operating cycle, said time interval being slightly longer than the period of rest between consecutive operating cycles, whereby a field station after having transmitted a single cycle of indications is prevented from transmitting for a second time if a second field station is ready to transmit indications.

7. In a code type communication system for transmitting indications to a control office from any one of a number of field stations one at a time during separate operating cycles; a code transmitter for each field station operable to transmit an indication code to the control office; a cycle marking relay energized at the beginning of each operating cycle of the system and maintained energized until the end of such cycle; a slow release cycle suppressing relay for each station energized by the enrgization of said cycle marking relay at that station only if the operating cycle is produced by the code transmitter for that station, said slow release relay being governed by said cycle marking relay so as to be deenergized at the end of such cycle but remaining in its energized condition for a time interval slightly longer than said cycle marking relay remains deenergized if another operating cycle immediately follows; and a starting circuit at each station closed only if said slow release relay at that station is in its deenergized condition for governing the operation of the corresponding code transmitter; whereby said slow release relay is energized when its associated transmitter operates to send indications and prevents the starting circuit from initiating a second operation of that code transmitter if a second field station is ready to transmit indications and consequently starts another operating cycle before such slow release relay has had time to assume its deenergized condition after the next preceding cycle.

8. In a code communication system of the character described for transmitting indications to a control office from any one of a number of field stations one at a time during different operating cycles; code transmitting apparatus at each station operable to transmit an indication code from that station to the control office; means including a lock-out relay at each station for rendering said code transmitting apparatus effective for only one station during an operating cycle in the event that more than one station is ready to transmit indications; a cycle marking relay at each station energized at the beginning and throughout each operating cycle of the system; a slow release cycle suppressing relay at each station; a pick-up circuit for each slow release relay closed only if the corresponding cycle marking relay and lockout relay are both energized; a stick circuit for said slow release relay dependent upon the energization of said cycle marking relay alone; a starting circuit at each station effective only if said slow release relay at that station is in its deenergized condition for initiating operation of the code transmitting apparatus at that station, said slow release relay having a release time slightly longer than the period of rest during which said cycle marking relay is deenergized between two consecutive operating cycles; whereby a second operation of the code transmitting apparatus of a station which has once operated is prevented by the associated slow release relay so long as there is any other station ready to send indications and thus cause an operating cycle immediately following the next preceding cycle.

9. In a communication system of the code type for transmitting indications to a control office from any one of a number of field stations one at a time; a code transmitter at each field station operable to transmit during an operating cycle an indication code identifying the station and characterizing the indications to be transmitted from that station; a plurality of changeable devices at each station adapted to assume different operating conditions to be indicated in the control office; a starting circuit at each station for initiating operation of the associated code transmitter; means responsive to a change in the condition of any one of the changeable devices at a station for governing the energization of the corresponding starting circuit; a time element relay at each station automatically operated to its active condition during an operating cycle only if said starting circuit for the corresponding station has been conditioned to initiate operation of the corresponding code transmitter, said time element relay in its active condition rendering said starting circuit ineffective, said time element relay being released at the end of an operating cycle but assuming its inactive condition only after an interval of time which is slightly longer than the period of rest between consecutive cycles; whereby the code transmitter at a station which has once operated is prevented from operating the second time if changes have occurred in the changeable devices associated with a second station to cause a second cycle so close to the first cycle that there is not time for the time element device associated with the transmitter that has once operated to assume its inactive condition and permit the starting circuit associated with that transmitter to be effective before such second cycle is started.

10. In a communication system of the code type for the communication of indications of the operated condition of a number of changeable devices at various field locations to a distant control office, said changeable devices being associated with different field stations; a line circuit connecting the control office at the several field stations; a line relay in said line circuit at each field station; code transmitting apparatus at each field station including a step-by-step mechanism governed by the corresponding line relay and effective during an operating cycle of a predetermined number of steps to transmit to the control office an indication code identifying the station and the indications of the existing condition of the changeable devices associated with that station; a cycle marking relay at each station governed by said line relay and energized at the beginning and throughout each operating cycle of the system; means at each station including a starting circuit responsive to a change in the condition of any one of the changeable devices at that station for initiating an operating cycle of the associated code transmitting apparatus; a slow-release cycle suppressing relay for each station acting in its energized condition to render said starting circuit ineffective; means for initially energizing said slow-release relay at each station only if the associated code transmitting apparatus is in operation during an operating cycle; a stick circuit for maintaining said slow-release relay energized after initial energization thereof so long as the associated cycle marking relay is energized, said slow-release relay being thus deenergized by the release of the cycle marking relay at the end of each cycle but assuming its deenergized condition after a release time which is slightly longer than the period of rest during which the cycle marking relay is deenergized between consecutive cycles; whereby said slow-release cycle suppressing relay at a station is effective once the transmitting apparatus for that station has operated to prevent a second operation thereof so long as closely spaced consecutive cycles are produced by other stations having new indications to transmit.

11. In a system for transmitting control codes from a control office to a selected one of a plurality of field stations and for also transmitting indications from any one of said field stations one at a time to the control office; code transmitting and receiving apparatus at each field station including a step-by-step mechanism having an operating cycle and operable to receive controls transmitted from the control office and to transmit indications from the corresponding field station to the control office; a cycle marking relay at each field station energized at the beginning and throughout each operating cycle of the system for the transmission of either controls or indications; a plurality of changeable devices at each field station having different operated conditions to be indicated in the control office; a lock-out relay at each field station for initiating operation of the code transmitting apparatus to transmit indications to the control office; a starting circuit including a back contact of said cycle marking relay for energizing said lock-out relay; means responsive to a change in the condition of any one of the changeable devices at a station for supplying energizing current to the associated starting circuit; a slow release cycle suppressing relay at each station; a a pick-up circuit for said slow release relay including a front contact of the corresponding lock-out relay; and a stick circuit for said slow-release relay closed while the corresponding cycle marking relay is energized, said slow-release relay for any station being energized by its pick-up circuit during an operating cycle of transmission of indications from that station only and being maintained energized by its stick circuit until the cycle marking relay at that station drops at the end of such cycle, the release time of said slow release relays being slightly longer than the time said cycle marking relay is deenergized between consecutive cycles, whereby any station that has once operated to transmit indications is prevented from operating a second time until there is a pause after a series of consecutive cycles that may be produced by transmission of controls or transmission of indications from any other field station, because said stick circuit is repeatedly closed once for each consecutive cycle.

12. In a code type communication system of the character described for transmitting indications from any one of a plurality of field stations one at a time to a distant control office; a line circuit connecting the control office with the several stations; field equipment for each station comprising; a transmitter having contacts governing the energization of said line circuit to provide a station identifying code call and an indication code; a cycle marking relay energized at the beginning and throughout a cycle of operation of said transmitter; a lock-out relay adapted when energized to open one line wire of the line circuit and connect the portion thereof extending to the control office through the transmitting contacts to the other line wire; a plurality of changeable devices having different operated conditions to be indicated in the control office; starting means responsive to change in the condition of any one of said changeable devices for supplying energizing current to said lock-out relay; a slow release cycle suppressing relay effective when in the energized condition to render said starting means ineffective; a pick-up circuit for said slow release relay closed only if said cycle marking relay and said lock-out relay are both energized; and a stick circuit for said slow release relay including a contact closed while said cycle marking relay is energized, said slow release relay at a field station being thus energized during a cycle of operation of the transmitter at that field station only and remaining in its energized condition after the end of such cycle for a time interval which is slightly greater than the time elapsing between successive energizations of said cycle marking relay for consecutive cycles; whereby said cycle suppressing relay at any station after being initially energized in connection with the transmission of indications from that station is maintained energized and prevents further transmission of indications from that station until there is a pause after an operating cycle longer than the time elapsing between consecutive cycles produced so long as one or more other stations are ready to transmit indications.

13. In a system for transmitting by code, each code comprising a plurality of current impulses, indications from a plurality of field stations at an office one at a time comprising; a line circuit extending from an office through the nearest field station to a more remote field station; means including a lock-out relay at each of said field stations for when energized allowing its station to transmit an indication code to the office and preventing all inferior field stations from transmitting an indication to the office; a cycle marking relay at each station for, by picking up, marking the beginning, by being energized marking the duration and by dropping marking the end of a code cycle; a station suppression relay; a pick-up circuit for said lock-out relay including a back contact of said station suppression relay and a back contact of said cycle marking relay; and means including said cycle marking relay for picking up the station suppression relay for a particular station when that station starts to transmit an indication code to said office, and for maintaining it energized through that code cycle and all consecutive code cycles immediately following transmission of an indication code cycle from that particular station; whereby the transmission of an indication from a particular station renders all other stations superior to that station as to the use of the line circuit.

NEIL D. PRESTON.